United States Patent
Motose

[11] Patent Number: 6,021,748
[45] Date of Patent: Feb. 8, 2000

[54] PLANING BOAT ENGINE

[75] Inventor: Hitoshi Motose, Hamamatsu, Japan

[73] Assignee: Yamaha Hatsudoki Kabushiki Kaisha, Iwata, Japan

[21] Appl. No.: 09/093,742

[22] Filed: Jun. 8, 1998

[30] Foreign Application Priority Data

Jun. 6, 1997 [JP] Japan .................................. 9-149218

[51] Int. Cl.⁷ .............................. F02B 75/02; F02D 9/04
[52] U.S. Cl. ................................ 123/65 PE; 123/65 PD; 123/65 V
[58] Field of Search ............................ 123/65 PE, 65 V, 123/65 PD

[56] References Cited

U.S. PATENT DOCUMENTS

| | | | |
|---|---|---|---|
| 4,399,788 | 8/1983 | Bostelmann | 123/65 PE |
| 4,723,514 | 2/1988 | Taniuchi | 123/65 V |
| 4,793,347 | 12/1988 | Taniuchi et al. | 123/65 PE |
| 5,190,006 | 3/1993 | Motoyama et al. | 123/65 PE |
| 5,588,402 | 12/1996 | Lawrence | 123/65 PE |
| 5,782,214 | 7/1998 | Nanami et al. | 123/65 PE |
| 5,873,334 | 2/1999 | Heinrich | 123/65 PE |

FOREIGN PATENT DOCUMENTS 408210139A   8/1996   Japan .

Primary Examiner—Willis R. Wolfe
Assistant Examiner—Brian Hairston
Attorney, Agent, or Firm—Knobbe, Martens, Olson & Bear LLP

[57] ABSTRACT

A control arrangement for a planing-type boat having an engine powering a water propulsion device is disclosed. The engine has at least one combustion chamber, an exhaust port leading from the combustion chamber, and an exhaust timing valve cooperable with the exhaust port. The exhaust timing valve is moveable between a first retracted position and a second extended position, where in the second position a flow of exhaust through the exhaust port has a shorter duration than when the valve is in the first position. A drive unit is associated with the exhaust timing valve. The control is arranged to move the exhaust timing valve with the drive unit from the second position towards the first position at a predetermined high engine speed. The control is arranged to prevent the rapid movement of said exhaust timing valve between its first and second positions when the engine speed fluctuates about the predetermined engine speed.

12 Claims, 5 Drawing Sheets

PLANING BOAT ENGINE

FIELD OF THE INVENTION

The present invention relates to an engine of the type used to power a planing-type boat. More particularly, the invention is a control arrangement for the exhaust timing valve(s) of such an engine.

BACKGROUND OF THE INVENTION

Internal combustion engines include exhaust control mechanisms for controlling the flow of exhaust from each combustion chamber of the engine. In most instances, these mechanisms comprise valves.

In those instances where the engine operates on a two-stroke or two-cycle principal, the valve is often of the sliding or rotating type. Generally, this type of valve does not serve to ever completely close the opening or port in the combustion chamber wall or the exhaust passage. Instead, the valve moves between a first position in which the valve does not obstruct or obstructs very little of the exhaust port, and a second position in which the valve partly obstructs the port. In the first position, the timing of the opening of the exhaust port as the piston moves down is advanced, and the timing of the closing of the exhaust port as the piston moves up is delayed, providing for a longer exhaust duration as compared to that when the exhaust timing valve is in the second position. By moving the exhaust timing valve between its first and second positions or positions therebetween, the timing and duration of the exhaust flow, and thus the performance or running conditions of the engine, can be adjusted.

In many instances, an engine employing this type of exhaust valve is used to power a water propulsion device of a planing type boat. The exhaust timing valve of this type of engine is conventionally operated in the following manner.

When the boat is being operated at speed below a predetermined high speed (this speed normally being higher than the speed at which the boat planes), the exhaust valve is moved to its substantially closed second position. In this position, the compression ratio and combustion time are increased, providing high engine power and torque. In addition, blow-by of undesirable emissions such as unburned fuel is reduced.

When the boat speed increases above the predetermined high speed, the engine speed must similarly be increased. At this time, the exhaust valve is moved to its open first position. In this position the exhaust gases flow more freely from the combustion chamber, lowering exhaust resistance and permitting higher engine speeds.

The problem arises that the engine speed in this type of boat may quickly move back and forth between speeds above and below the predetermined speed at which the position of the exhaust timing valve is changed. For example, a rider may accelerate the boat towards a wave. If the boat becomes airborne and the resistance on the water propulsion device is reduced, the engine speed is likely to spike quickly above the predetermined high speed. The exhaust valve is then moved from the second to the first position. Once the boat re-enters the water, however, a high load is placed on the engine and its speed quickly drops back below the predetermined speed. The exhaust valve is then moved back to the second position.

This arrangement is detrimental due to the frequent movement of the exhaust timing valve. The timing of this movement may affect boat performance. For example, when the exhaust timing valve is in the first position when the boat enters the water in the above-described arrangement and the load is placed on the engine, the engine may stall or the boat may at least be sluggish until the exhaust timing valve is repositioned.

An engine control for an engine powering a planing-type boat which overcomes the above-stated problems is desired.

SUMMARY OF THE INVENTION

In accordance with the present invention, there is provided an engine control for a planing-type boat having an engine powering a water propulsion unit.

The engine has at least one combustion chamber, an exhaust port leading from the combustion chamber. An exhaust timing valve is cooperable with the exhaust port. The exhaust timing valve is moveable between a first retracted position and a second extended position. In the second position a flow of exhaust through the exhaust port has a shorter duration than when the valve is in the first position. A drive unit is associated with the exhaust timing valve.

The control is arranged to move the exhaust timing valve with the drive unit from its second position towards its first position at a predetermined high engine speed. The control is arranged to prevent the rapid movement of said exhaust timing valve between its first and second positions when the engine speed fluctuates about the predetermined engine speed.

In one embodiment, the control includes means for providing an average engine speed over time and the control moves the valve based on the average engine speed.

In another preferred embodiment, the control is arranged to move the exhaust timing valve in the direction of its first position when the engine speed reaches the predetermined speed, and is arranged to move the exhaust timing valve in the direction of its second position at an engine speed less than the predetermined speed.

In another embodiment, the control is arranged to move the exhaust timing valve between its first and second positions in incremental steps at increasing or decreasing engine speeds.

In yet another embodiment, the control is arranged to move the exhaust timing valve slower than when the control moves the exhaust timing valve at a time other than when the predetermined engine speed is reached.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In general, the present invention relates to an engine powering a planing type boat such as a personal watercraft. More particularly, the invention is a control arrangement for an exhaust timing valve associated with the engine powering the boat. This control is described for use in conjunction with an engine used in powering a planing type boat since this is an application for which the control has particular utility. Those of skill in the art will appreciate that the control may be used in a variety of other applications.

Figure 1:
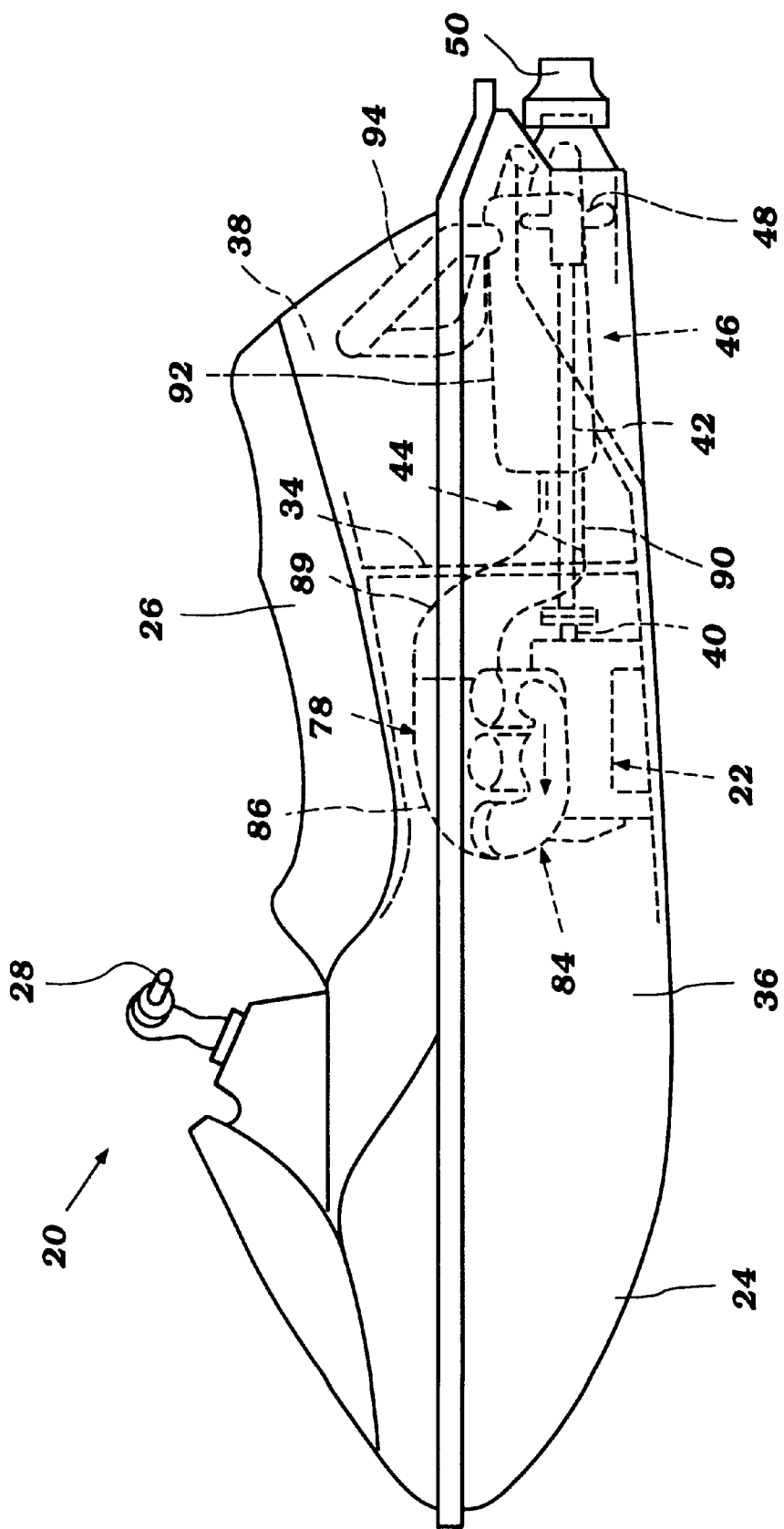
FIG. 1 is a side view of a personal watercraft of the type powered by an engine controlled in accordance with the present invention, the engine and other watercraft components positioned within the watercraft illustrated in phantom.
Figure 2:
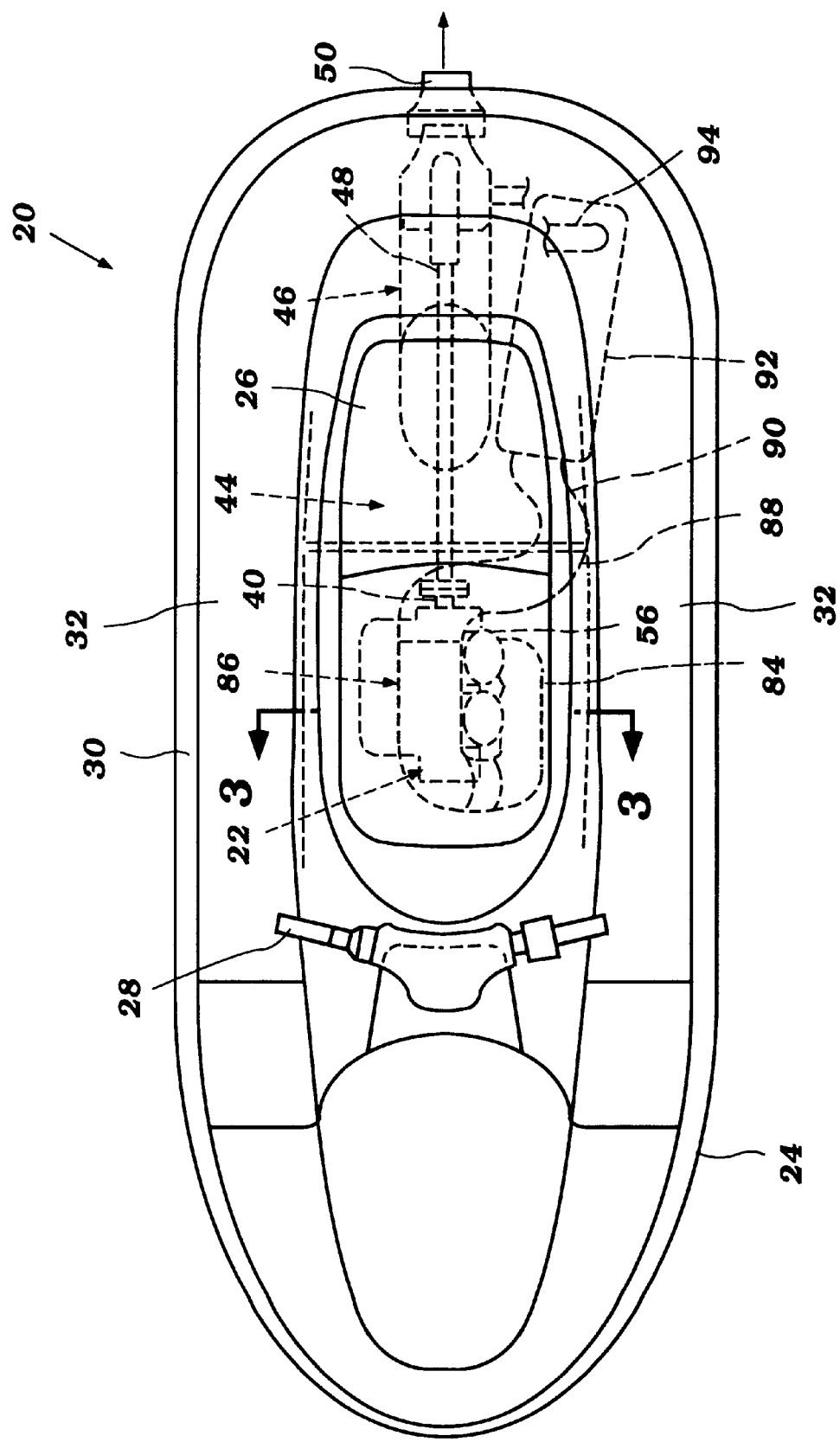
FIG. 2 is a top view of the watercraft illustrated in FIG. 1, with the engine and other watercraft components positioned within the watercraft illustrated in phantom.

FIGS. 1 and 2 illustrate a planing type boat, namely a personal watercraft 20. Those of skill in the art will appreciate that the invention is useful with other types of planing-type boats.

The watercraft 20 has a hull 24. A seat 26 is positioned on a top portion of the hull 24. The seat 26 is preferably connected to a removable deck member. A steering mechanism 28 is provided adjacent the seat 26 for use by a user in directing the watercraft 20.

As best illustrated in FIG. 2, a bulwark 30 extends upwardly along each side of the watercraft 20. A foot step area 32 is defined between the seat 26 and its adjacent bulwark 30. The hull 24, along with a bulkhead 34, defines an engine compartment 36 and a pumping chamber 38. An engine 22 is positioned in the engine compartment 36. The engine 22 is preferably partially accessible through a maintenance opening accessible by removing the removable deck member on which the seat 26 is mounted.

The engine 22 has a crankshaft 40 which is in driving relation with an impeller shaft 42. The impeller shaft 42 rotationally drives a means for propelling water of a propulsion unit 44. Referring to FIG. 1, the propulsion unit 44 includes a propulsion passage 46 having an intake port which extends through the lower portion of the hull 24. The means for propelling water preferably comprises an impeller 48 positioned in the passage 46.

The impeller 48 draws water from the body of water in which the watercraft 20 is positioned into the intake port and expels it through an outlet at the stem or rear of the watercraft 20. Preferably, a nozzle 50 is movably mounted at the outlet for directing the water which is expelled therefrom. The nozzle 50 is linked to the steering mechanism 28, whereby the operator of the watercraft 20 may move the nozzle 50, directing the water expelled through the outlet, thus guiding the watercraft 20.

Figure 3:
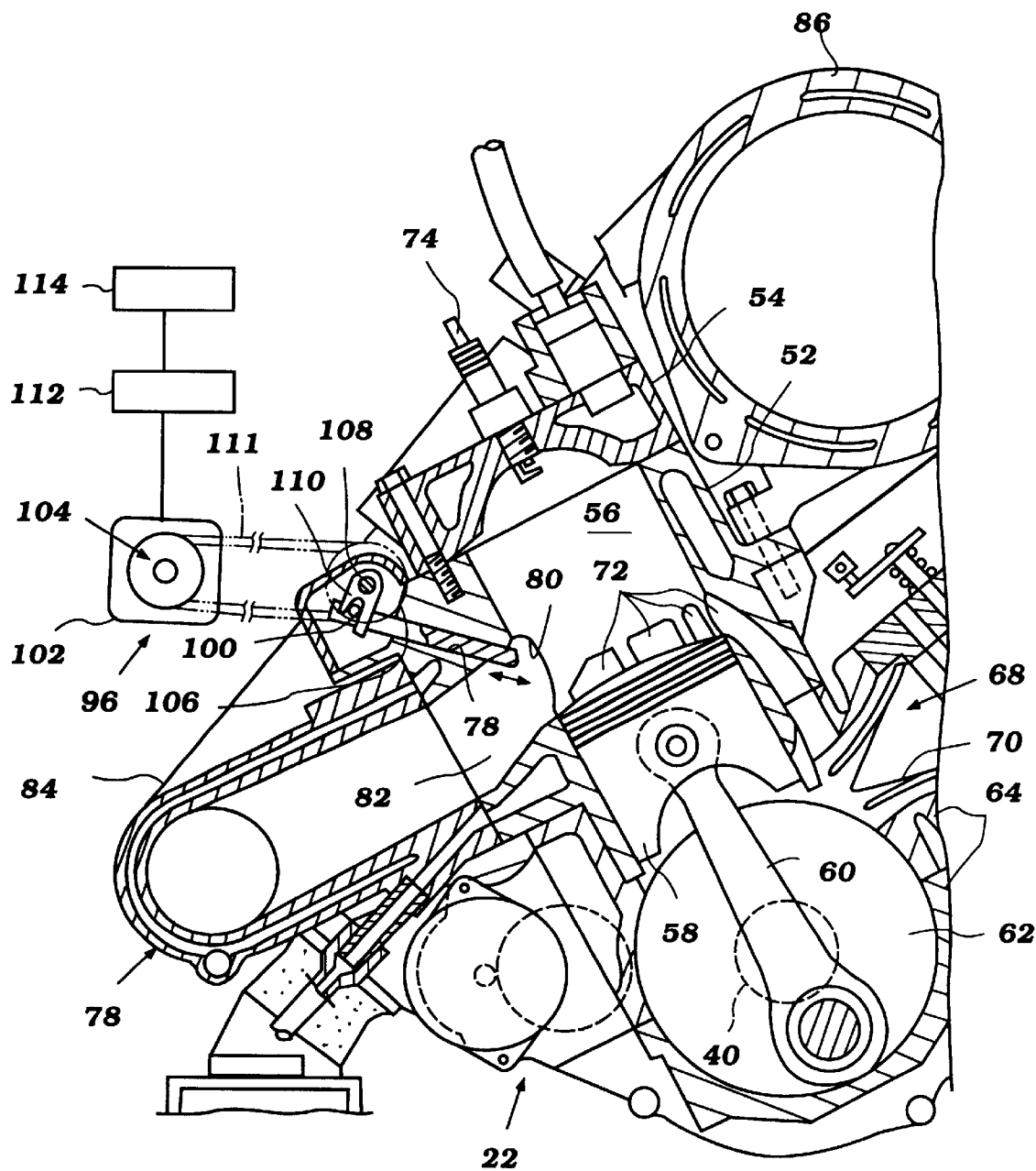
FIG. 3 is a cross-sectional view of a portion of the engine illustrated in FIG. 2, taken along line 3—3 therein, illustrating the engine and an exhaust timing valve and valve control thereof.

The engine 22 is best illustrated in FIG. 3. As illustrated therein, the engine 22 is preferably of the two-cylinder, two-cycle variety. Of course, the engine 22 may have as few as one, or more than two, cylinders and operate in accordance with other operating cycles, as may be appreciated by one skilled in the art.

The engine 22 includes a cylinder block 52 having a cylinder head 54 connected thereto and cooperating therewith to define two cylinders 56. A combustion chamber is defined by a cylinder wall within the block 52, a recessed area in the cylinder head 54 and a top of a piston 58. The piston 58 is movably mounted in the cylinder 56 and connected to the crankshaft 40 via a connecting rod 60, as is well known in the art.

The crankshaft 40 is rotatably journalled by a number of sealed bearings with respect to the cylinder block 52 within a crankcase chamber 62. Preferably, the chamber 62 is defined by a crankcase cover member 64 which extends from a bottom portion of the cylinder block 52. The crankshaft 40 has pin portions extending between web portions with each connecting rod 60 connected to one of the pin portions.

As illustrated partly in FIG. 3, the engine 22 includes means for providing an air and fuel mixture to each cylinder 56. Preferably, an intake system is provided for delivering air for combustion to the engine. The intake system draws air from within the engine compartment 36 (the air entering the engine compartment through one or more air inlets in the hull 24) into a silencer (not shown) and delivered through a carburetor (not shown).

Fuel is provided to the incoming air. In particular, fuel is drawn from a fuel supply (such as a fuel tank, not shown) by a fuel pump (not shown), and delivered through a fuel delivery line to the carburetor. A throttle valve (not shown) is preferably positioned along the intake path between the engine 22 and the carburetor for allowing the watercraft operator to control the rate of fuel and air delivery to the engine 22 for controlling the speed and power output of the engine via a throttle linkage. It is contemplated that the fuel may be provided by indirect or direct fuel injection, as well as via carburation, as known in the art.

The air and fuel mixture selectively passes through an intake port 68 into the crankcase chamber 62 as controlled by a reed valve 70, as is known in the art. As is also well known, an intake port 68 and corresponding reed valve 70 are preferably provided corresponding to each cylinder 56. The crankcase chamber 62 is compartmentalized so as to provide the crankcase compression feature for each combustion chamber as is well known in the operation of two-cycle engines.

The fuel and air charge within the crankcase chamber 62 is delivered to each cylinder 56 through several scavenge passages 72 leading to a number of scavenge ports in the cylinder wall.

A suitable ignition system is provided for igniting the air and fuel mixture provided to each combustion chamber. Preferably, this system comprises a spark plug 74 (see FIG. 3) corresponding to each combustion chamber and an appropriate ignition system control for use in controlling the firing of the ignition elements 74.

The engine 22 may include a lubricating system which provides lubricating oil to the various moving parts thereof. Such a system may include an oil tank or reservoir (not shown) from which lubricating oil is delivered and circulated throughout the engine, including for mixing with the fuel which is supplied to the engine, as is well known to those skilled in the art.

The engine 22 also preferably includes a suitable cooling system. Preferably, the cooling system is a liquid cooling system which draws cooling water from the body of water in which the watercraft 20 is being operated and circulates it through various cooling water jackets in the cylinder block 52, head 54, and the like.

Exhaust gas generated by the engine 22 is routed from the engine to a point external to the watercraft 20 by an exhaust system 78 which includes an exhaust passage or port 80 in the cylinder wall. An exhaust passage 82 extends from the port 80 through the cylinder head 54. An exhaust manifold 84 is connected to a side of the engine 22. The manifold 84 has a pair of branches with passages leading therethrough aligned with the two passages 82 leading through the cylinder head 54. The pair of passages defined by the manifold 84 merge into a single passage through the manifold 84.

After the branches of the manifold 84 merge, the manifold curves around the front end of the engine 22. An expansion pipe 86 is connected to the exhaust manifold 84, preferably via a flexible sleeve. The expansion pipe 86 has an enlarged passage or chamber 88 through which exhaust routed from merge passage in the exhaust manifold 84 flows. As illustrated in FIG. 3, the expansion pipe 86 preferably extends along the top of the engine 22 in the direction of the front to the rear of the watercraft 20. A catalyst (not shown) may be positioned within the expansion pipe 86.

Referring to FIGS. 1 and 2, after flowing through the expansion pipe 86, the exhaust flows into an upper exhaust pipe section 88 of the exhaust system. This portion of the exhaust system is tapers to a smaller diameter from that of the expansion pipe 86. This exhaust pipe 88 leads to a water lock 92. The upper exhaust pipe 88 is preferably connected to the water lock 92 via a flexible fitting 90, such as a rubber sleeve. The exhaust flows through the water lock 92, which is preferably arranged as known to those skilled in the art to prevent the flow of water through the exhaust system towards the engine 22, and then passes to a lower exhaust pipe 94 arranged to discharge the exhaust into the body of water in which the watercraft 20 is operating.

Referring again to FIG. 3, means are provided for controlling the timing of the flow of exhaust gases through each exhaust passage 82 from the cylinder 56. Preferably, this means comprises an exhaust timing control device 96. The exhaust timing control device 96 comprises a sliding knife-type exhaust timing valve 98 and means for moving the valve.

As illustrated in FIG. 3, the valve 98 has a generally flat or plate-like body having a first end positioned in the passage 82 at the exhaust port 80, and a pin 100 positioned at the other end. The valve 98 is arranged to move between a first retracted or "open" position in which the valve 98 does not generally obscure the passage 82, and a second extended or "closed" position in which the valve obscures a portion of the passage 82. When in its retracted position, the valve 98 may said to be in an "advancing" position, since the timing of the flow of exhaust from the cylinder occurs soon as the piston 58 moves downwardly in the cylinder. In this position, the timing of the closing of the passage 82 as the piston 58 moves up is delayed. On the other hand, when in the extended position, the valve 98 may be said to be in a "retarding" position, since the flow of exhaust from the cylinder is delayed since the piston must move farther down the cylinder before the passage 82 is opened. In this same position, the timing of the closing of the passage 82 as the piston 58 moves up is advanced. Of course, the valve 98 may be moved to a variety of positions between the first and second positions.

The means for moving the valve 98 preferably comprises a drive unit including a motor 102 arranged to move the pin 100 connected to the valve 98. As illustrated, a linkage links the motor 102 and the pin 100. The linkage preferably comprises a drive pulley 104 driven by the motor 102, a driven pulley 106 rotatably mounted to the engine 22 near the valve 98 by a pin 108, a drive element 111 extending between the pulleys 104,106 and a slotted drive element 110 connected to the driven pulley 106. The pin 100 of the valve 98 extends into the slot of the drive element 110, whereby rotation of the driven pulley 106 causes movement of the valve 98.

In the situation where the motor 102 is powered in only one direction, the valve 98 is preferably arranged to be biased, such as with a spring to its first position. In that instance, the motor 102 is arranged to counteract the spring and move the valve 98 into a variety of positions between its first and second positions.

Although the drive mechanism for only one of the two valves 98 of the engine 22 is illustrated in FIG. 3, the other valve is, of course, similarly driven. As will be appreciated by those of skill in the art, the same motor 102 may be arranged to drive the other valve, or an entirely separate drive motor and linkage may be utilized.

In accordance with the present invention, an exhaust timing valve control 112 is provided for controlling the movement of the valve 98 via the motor 102 or other valve-driving mechanism. The exhaust timing valve control 112 may be part of a larger engine control arranged to also control other aspects of the engine, such as the ignition element 74 firing timing and the like.

Figure 4A:
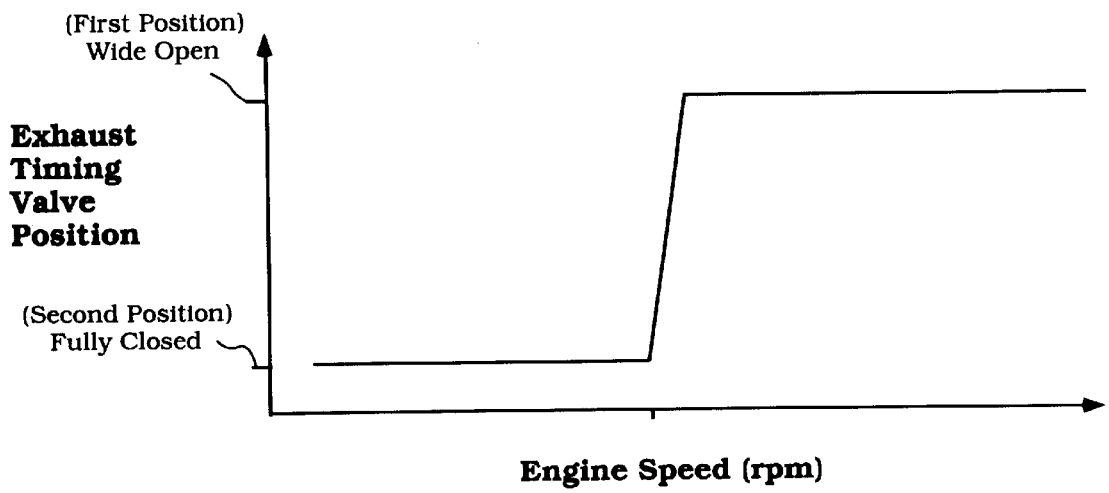
FIG. 4(a) is a graph illustrating an exhaust timing valve control strategy using the engine control in accordance with a first arrangement of the invention.
Figure 4B:
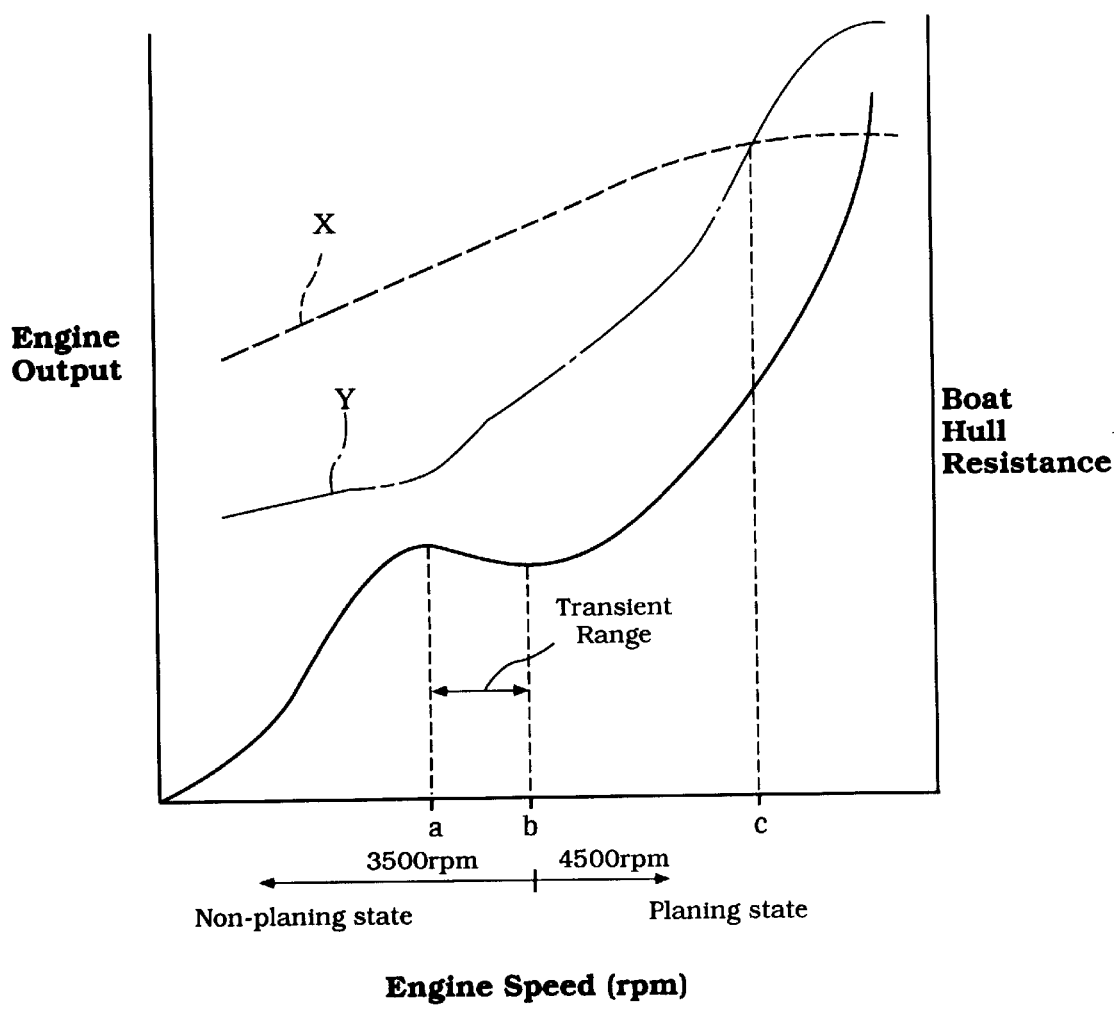
FIG. 4(b) is a graph illustrating engine output and boat hull resistance as they relate to engine speed.

In a first embodiment of the invention, the engine control including the exhaust timing valve control 112 includes an exhaust timing valve control map. The control map will be described with reference to FIGS. 4(a) and (b). As illustrated in FIG. 4(b), a first line X represents the engine output (power) for an engine having its exhaust valve in the closed position at all times. A second line Y represents the engine output for an engine having its exhaust valve in the open position at all times. As illustrated, the engine power is higher for the engine having its exhaust valve closed up to an engine speed c. Therefore, the control map is preferably arranged so that the exhaust timing valve is closed up to a detected engine speed c, and thereafter the exhaust valve is quickly opened. The exhaust timing valve position vs. engine speed in accordance with this control strategy is illustrated in FIG. 4(a).

In accordance with the present invention, means 114 are provided for controlling the exhaust timing valve control 112 in a manner which serves to reduce or eliminate the movement of the exhaust timing valve 98 between its first and second positions due to quick fluctuations in engine speed about the predetermined high engine speed c.

Preferably, this means 114 comprises a means for averaging the speed of the engine 22 over a time period, such as a computer or control which averages engine speed data received from a sensor. The exhaust timing valve control 98 is arranged to control the exhaust timing valve 98 based on this average speed.

The engine speed may be determined in a number of ways as known to those of skill in the art. For example, an engine speed sensor associated with the crankshaft 40 may be used to determine engine speed. These sensors are well known, and may comprise a magnetic pickup which senses the passage of one or more magnets mounted on the crankshaft 40.

In accordance with this arrangement, quick fluctuations in instantaneous engine speed will not affect the position of the exhaust timing valve 98. Instead, the exhaust timing valve control 112 is arranged to move the exhaust timing valve 98 in accordance with the more stable average speed of the engine 22. Thus, if the engine speed either quickly rises above the predetermined speed c or quickly falls below the speed c, the position of the exhaust timing valve 98 is not changed.

Figure 5:
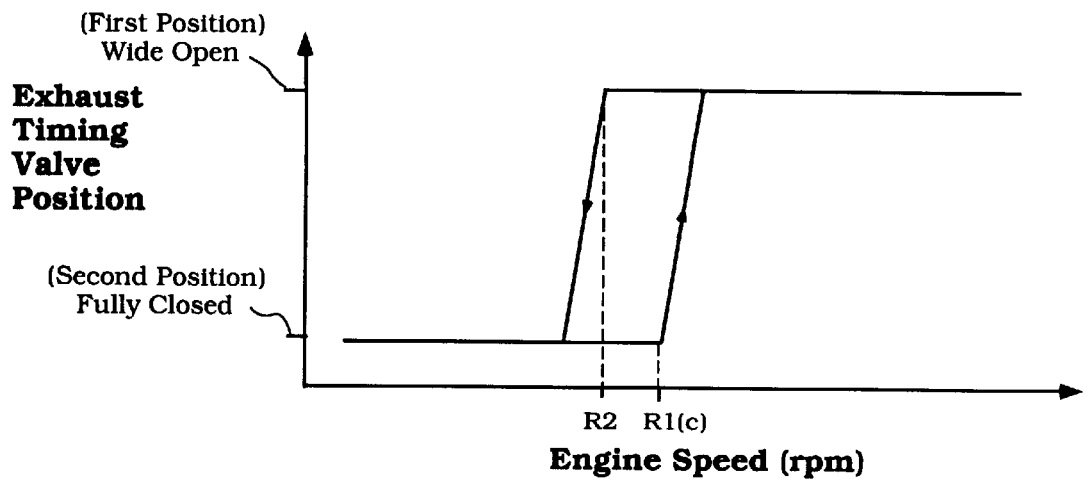
FIG. 5 is a graph illustrating exhaust timing valve position vs. engine speed when the exhaust timing valve is controlled in accordance with a second arrangement of the invention.

A second embodiment of the present invention will be described in conjunction with FIG. 5. This embodiment of the invention is arranged to be used with the watercraft 20 having the engine 22 as described above. In accordance with this embodiment, however, the exhaust timing valve control 112 is arranged to operate in a different manner and the means 114 is not included.

In this arrangement the exhaust timing valve control 112 is arranged to move the exhaust timing valve 98 from its second or extended position to or towards its first or retracted position at an engine speed R1. This engine speed R1 is essentially the same as the predetermined speed c described above. On the other hand, the exhaust timing valve control 112 is arranged to move the exhaust valve 98 from the first position to or towards the second position only when the engine speed falls to a speed R2. The speed R2 is less than the speed R1.

In accordance with this arrangement, small changes in the engine speed will not cause the exhaust timing valve control 112 to change the position of the exhaust timing valve 98 between its first and second positions.

Figure 6:
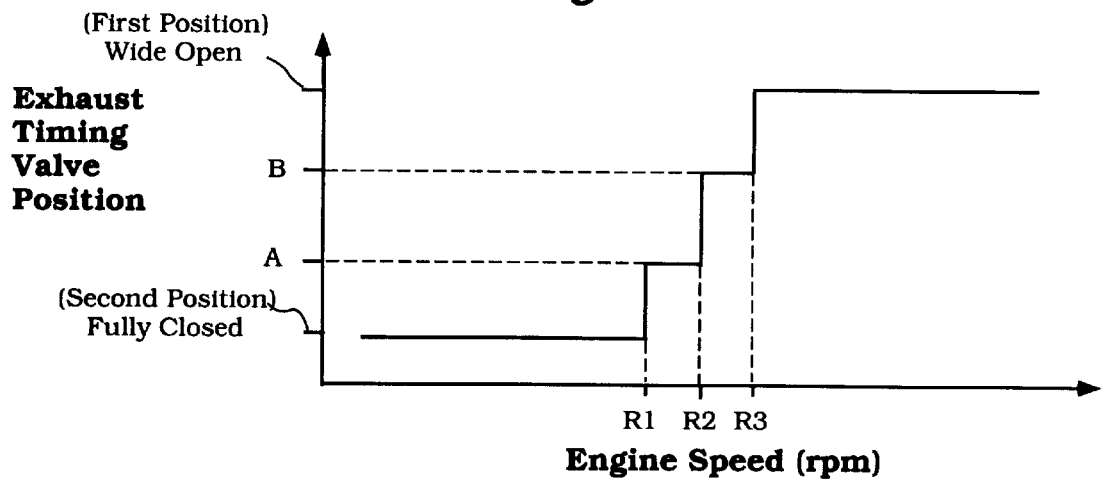
FIG. 6 is a graph illustrating exhaust timing valve position vs. engine speed when the exhaust timing valve is controlled in accordance with a third arrangement of the invention.

A third embodiment of the present invention will be described with reference to FIG. 6. This embodiment of the invention is again adapted for use with the watercraft 20 having the engine 22 described above, and includes an exhaust timing valve control 112.

In accordance with this embodiment, the exhaust timing valve control 112 is arranged to move the exhaust timing valve 98 between its first and second positions in incremental steps. Preferably, the exhaust timing valve control 112 is arranged to move the exhaust timing valve 98 from the second or closed position to a first partially open position A when the engine speed reaches a speed R1. If the engine speed further increases to a higher speed R2, the exhaust timing valve control 112 is arranged to move the exhaust timing valve 98 to a position B which is closer to the valve's first or open position. Finally, if the engine speed further increases to a higher speed R3, the exhaust timing valve control 112 is arranged to move the exhaust timing valve 98 to its first or fully open position. Likewise, the exhaust timing valve control 112 is arranged to move the exhaust timing valve 98 in the direction of the first position towards the second position in steps as the engine speed decreases.

In this arrangement, small fluctuations in the engine speed again do not cause the exhaust timing valve 98 to move completely between its first and second positions. This again prevents a quick fluctuation in engine speed from causing a rapid or quick change in exhaust timing valve 98 position which might result in poor engine performance or the like once the engine speed changes once again.

Of course, the exhaust timing valve control 112 may be arranged to move the exhaust timing valve 98 in as few as two steps at two different speeds or in more than three steps at more than three different speeds. In addition, the amount by which the valve 98 is moved at each incremental step may be of the same or a different size.

A fourth embodiment of the present invention will be described with reference to FIGS. 7(a) and (b). This embodiment of the invention is again for use with the watercraft 20 having the engine 22 described above, and includes an exhaust timing valve control 112. In accordance with this embodiment, the exhaust timing valve control 112 is arranged to control the speed of movement of the exhaust timing valve 98 via the motor 102.

Figure 7A:
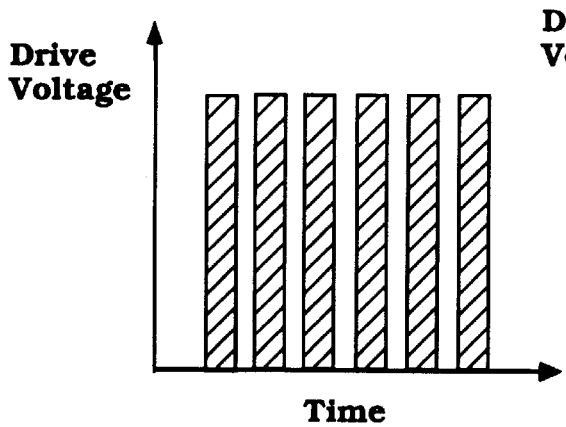
FIG. 7(a) is a graph illustrating an energization time for a drive unit moving the exhaust timing valve at a first time when controlled in accordance with a fourth arrangement of the invention.

FIG. 7(a) illustrates the time of energization of the motor 102 as controlled by the exhaust timing valve control 112 when the exhaust timing valve 98 is being moved at a time other than the low to high or high to low speed transition (i.e. at speed c in FIG. 4(b)) as described above. For example, the exhaust timing valve control 112 may be arranged to move the exhaust timing valve 98 in a cleaning operation upon engine shut-down. At this time the exhaust timing valve control 112 energizes the motor 102 in long durations, permitting quick movement of the valve.

Figure 7B:
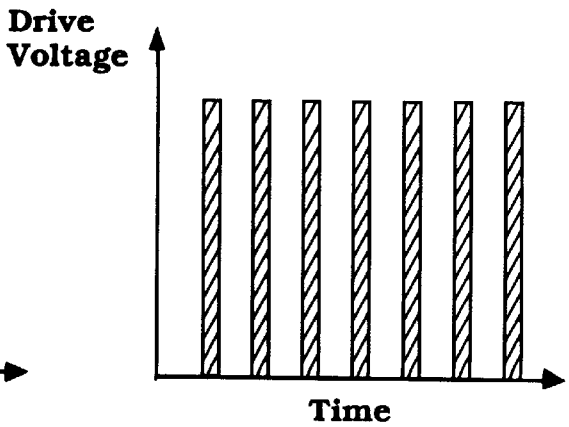
FIG. 7(b) is a graph illustrating an energization time for a drive unit moving the exhaust timing valve at a second time when controlled in accordance with the fourth arrangement of the invention.

On the other hand, as illustrated in FIG. 7(b) the exhaust timing valve control 112 is arranged to energize the motor 102 in shorter durations when the exhaust timing valve 98 is being moved between its first and second positions at the transition speed (i.e. speed c in FIG. 4(b)). So arranged, the exhaust timing valve 98 is moved more slowly. Those of skill in the art will appreciate that when another drive unit is used to move the valve 98, the control 112 may be similarly arranged to move the valve 98 more slowly than at other times.

Since the exhaust timing valve 98 is moved more slowly, fluctuations in engine speed about the predetermined speed c at which the exhaust timing valve 98 is moved between its first and second positions does not result in as significant of an effect on the position of the valve. For example, if the exhaust timing valve 98 has been moved to its first position and then the engine speed quickly drop below the engine speed c and then rises back above that speed, the exhaust timing valve 98 will not be moved completely to its second position when the engine speed drops. Instead, the exhaust timing valve 98 is likely to be only slightly moved in this direction, having little effect on the performance of the engine when its speed increases again above the predetermined speed c.

While the control 112 as described above as being used to move the exhaust timing valve 98 to or from its first or second positions, it should be understood that the valve 98 may simply be moved towards those positions. For example, the second position does neither need to be interpreted as being that position where the valve 98 is extended its maximum amount, nor is the first position necessarily that position where the valve 98 is retracted by its maximum amount.

While the control 112 has been described in conjunction with the control of a single exhaust timing control valve 98, the description is meant to apply to the similar control of each valve 98 associated with the engine 22.

Further, while the particular valve 98 which has been described is of the sliding knife-type valve, those of skill in the art will appreciate that the exhaust timing valve may comprise a rotating or other valve which provides the same or similar exhaust flow timing control.

Of course, the foregoing description is that of preferred embodiments of the invention, and various changes and modifications may be made without departing from the spirit and scope of the invention, as defined by the appended claims.

What is claimed is:

1. A control for a planing-type boat having an engine powering a water propulsion device, said engine having at least one combustion chamber, an exhaust port leading from said combustion chamber, an exhaust timing valve cooperable with said exhaust port, said exhaust timing valve moveable between a first retracted position and a second extended position where in said second position a flow of exhaust through said exhaust port has a shorter duration than when said valve is in said first position, an engine speed sensor for sensing the speed of said engine, and a drive unit arranged to move said exhaust timing valve, said control arranged to hold said exhaust timing valve in said second position when sensed engine speed is in a range below a first engine speed range, to rapidly move said exhaust timing valve with said drive unit from said second position to a new position towards said first position at a predetermined higher engine speed above said first engine speed range and to hold said exhaust timing valve in said new position when said sensed engine speed is in a second range the lower end of which comprises said predetermined higher engine speed.

2. A control for a planing-type boat having an engine powering a water propulsion device, said engine having at least one combustion chamber, an exhaust port leading from said combustion chamber, an exhaust timing valve cooperable with said exhaust port, said exhaust timing valve moveable between a first retracted position and a second extended position where in said second position a flow of exhaust through said exhaust port has a shorter duration than when said valve is in said first position, and a drive unit arranged to move said exhaust timing valve, said control arranged to move said exhaust timing valve with said drive unit from said second position towards said first position at a predetermined high engine speed, said control including means for preventing the rapid movement of said exhaust timing valve between said first and second positions when said engine speed fluctuates about said predetermined engine speed comprising means for averaging a speed of said engine over time and wherein said control is arranged to move said exhaust timing valve based on said average speed of said engine.

3. The control in accordance with claim 1, wherein said new position comprises means said first position.

4. A control for a planing-type boat having an engine powering a water propulsion device, said engine having at least one combustion chamber, an exhaust port leading from said combustion chamber, an exhaust timing valve cooperable with said exhaust port, said exhaust timing valve moveable between a first retracted position and a second extended position where in said second position a flow of exhaust through said exhaust port has a shorter duration than when said valve is in said first position, and a drive unit arranged to move said exhaust timing valve, said control arranged to move said exhaust timing valve with said drive unit from said second position towards said first position at a predetermined high engine speed, said control including means for preventing the rapid movement of said exhaust timing valve between said first and second positions when said engine speed fluctuates about said predetermined engine speed comprising moving said exhaust timing valve slower when said exhaust timing valve is being moved at said predetermined speed than when said exhaust timing valve is being moved at a time other than at said predetermined speed.

5. The control in accordance with claim 4, wherein said drive unit includes an electrically powered motor and said means for preventing is arranged to decrease the energization time of said motor as compared to the energization time when said exhaust timing valve is being moved at a time other than at said predetermined speed.

6. The control in accordance with claim 1, wherein said new position is a position intermediate said first and second positions and said control moves said exhaust timing valve between its first and second positions in at least two incremental steps at two different predetermined engine speeds and said exhaust timing valve is held in each position through a respective speed range.

7. A method of controlling an exhaust timing valve of an engine powering a planing-type boat, said engine having at least one combustion chamber, an exhaust passage leading from said combustion chamber and said exhaust timing valve movable between a first position and a second position, said valve in said second position obscuring said exhaust port to a greater degree than when said valve is in said first position, comprising the steps of: positioning said valve substantially in said second position when said engine speed is below a predetermined engine speed, moving said valve towards said first position when said engine speed exceeds said predetermined engine speed, and preventing the rapid movement of said valve back towards said second position if said speed of said engine fluctuates comprising the step of averaging a speed of said engine over time and moving said valve based on said average engine speed.

8. The method in accordance with claim 7, wherein said preventing step comprises the step of moving said valve back towards said second position only if a speed of said engine falls below a second speed lower than said predetermined speed.

9. A method of controlling an exhaust timing valve of an engine powering a planing-type boat, said engine having at least one combustion chamber, an exhaust passage leading from said combustion chamber and said exhaust timing valve movable between a first position and a second position, said valve in said second position obscuring said exhaust port to a greater degree than when said valve is in said first position, comprising the steps of: positioning said valve substantially in said second position when said engine speed is below a predetermined engine speed, moving said valve towards said first position when said engine speed exceeds said predetermined engine speed, and preventing the rapid movement of said valve back towards said second position if said speed of said engine fluctuates comprising the step of moving said valve between its first and second positions at said predetermined engine speed at a slower rate than another time said valve is moved between said positions.

10. The method in accordance with claim 9, wherein an electric motor is used to move said valve and said preventing step comprises reducing an energization time of said motor.

11. The control in accordance with claim 1, wherein the control moves the exhaust timing valve from said first position back to said second position when the speed decreases, a speed to exhaust timing valve position curve of said control being different for speed increasing conditions than for speed decreasing conditions.

12. The control in accordance with claim 11, wherein the exhaust timing valve is moved back towards the second position at a lower speed upon reducing speed conditions than the speed at which said exhaust timing valve is moved from said second position toward said first position upon increasing speed conditions.

\* \* \* \* \*